March 6, 1934.    J. HEITMANN    1,949,648
MEASURE DISPENSING COFFEE CONTAINER
Filed June 15, 1932
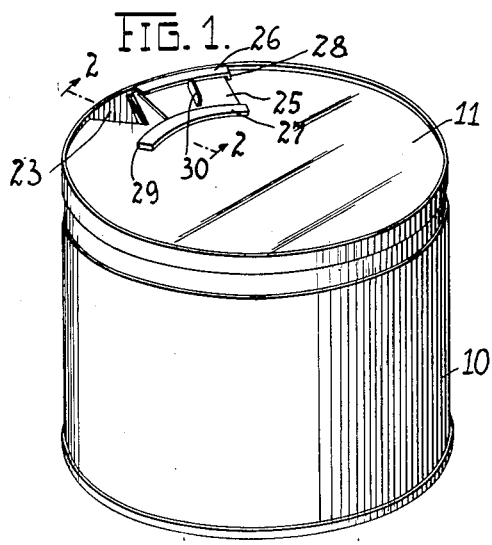
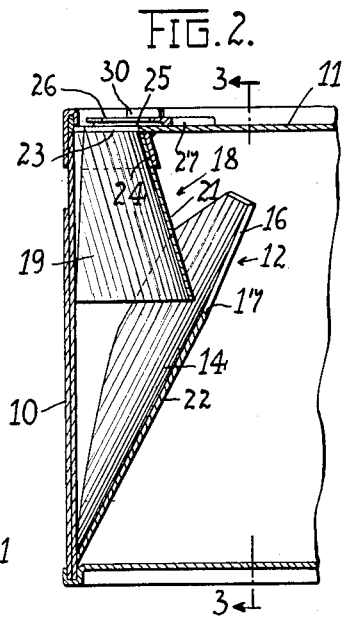
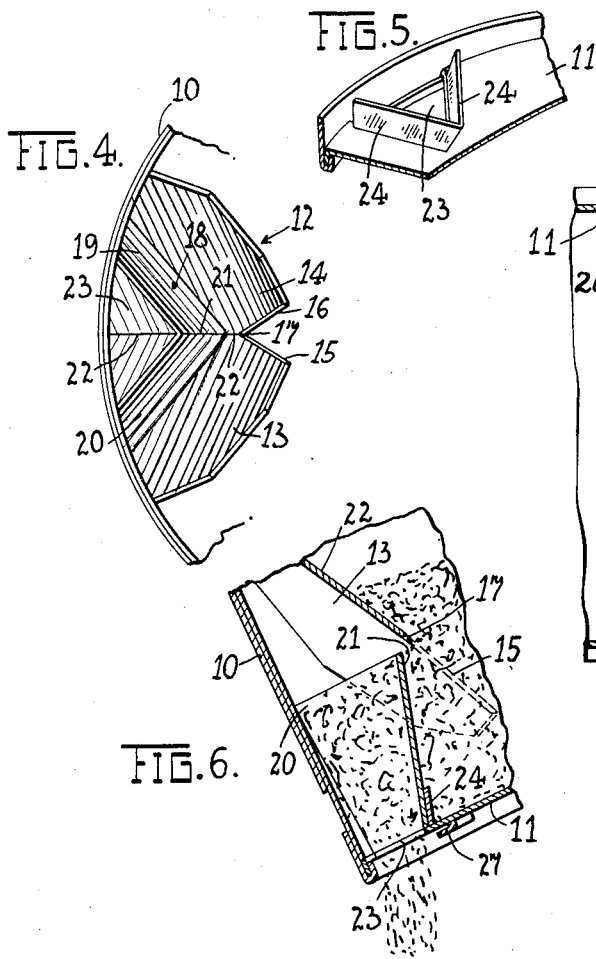
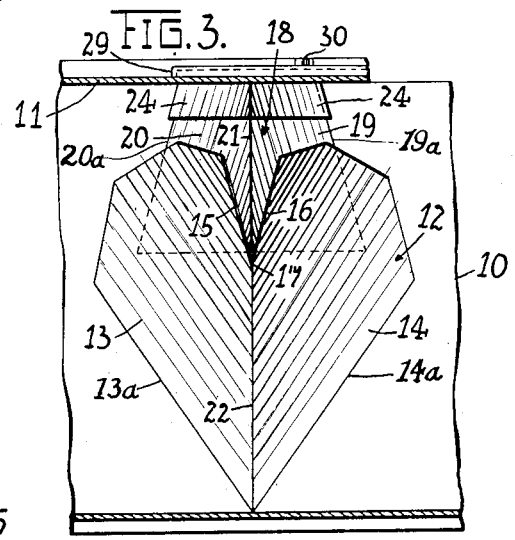
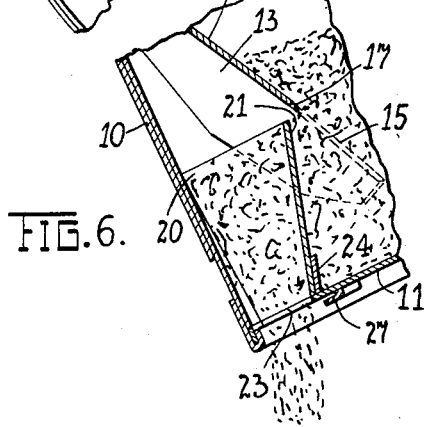
INVENTOR
JOHN HEITMANN
BY F. Lederman
his ATTORNEY Patented Mar. 6, 1934

1,949,648

UNITED STATES PATENT OFFICE 1,949,648

MEASURE-DISPENSING COFFEE CONTAINER

John Heitmann, New York, N. Y.

Application June 15, 1932, Serial No. 617,317

1 Claim. (Cl. 221—98)

The main object of this invention is the provision of a device adapted to be built integral with or mounted on the inside of a container such as is commonly used to contain granular coffee or another material, whereby once the container has been tilted to dispense a given measure of the contents, each succeeding dispensing will cause a fixed predetermined amount of the contents to pour from the container.

Another object of the invention is the provision of a device as above mentioned comprising a pair of oppositely disposed housing members secured respectively to the top and bottom of the inner wall of such a container to provide oppositely disposed tapering compartments, the upper member having an outlet or opening therein through which the material of the container is adapted to be poured.

A further object of the invention is the provision of a suitably slidable opening in the top or cover of the container, through which the contents may be poured and which may be sealed when not in use.

The above and other objects will become apparent in the description below, in which characters of reference refer to like-named parts in the drawing.

Referring briefly to the drawing, Figure 1 is a perspective view of the container with the sealing flap in open position.

Figure 2 is a fragmentary cross-sectional view through the center of the measuring apparatus in the device taken substantially on the line 2—2 of Figure 1.

Figure 3 is a fragmentary cross-sectional view taken on the line 3—3 of Figure 2.

Figure 4 is a fragmentary plan view of the container with the cover removed.

Figure 5 is an inverted fragmentary perspective view of the cover.

Figure 6 is a fragmentary cross-sectional view similar to Figure 2, showing the container inverted and a measured portion of the contents being poured out.

Referring in detail to the drawing, numeral 10 represents a container of the type usually found in the coffee industry for containing coffee for household use. Such containers are equipped with a removable cover 11 which, however, in the case of this invention may be permanently affixed to the container. On the inner wall of the container a wing-like member 12 is mounted comprising two symmetrical halves 13 and 14 of substantially the outline shown. The edges 13a and 14a of these members lie against the wall and are affixed thereto in any suitable manner. In the upper central portion of the member 12, an acute-angle having the apex 17 is provided by the mutually inclined edges 15 and 16. Affixed to the upper portion of the wall directly above the member 12, is a funnel-like member 18 composed of two similar side members 19 and 20, joined together by a seam 21, the edges 19a and 20a lying in contact with the wall and being secured thereto in any desirable manner. The seam 21 of the member 18 is in alignment, as shown in Figure 3, with the similar joining seam 22 of the members 13 and 14. At the upper end of the member 18, a relatively narrow mouth 23 is provided, the lower mouth of this member being wider and lying within the confines of the housing or compartment formed by the member 12 and the wall 10.

In the opening formed in the cover 11, which opening is of substantially the same triangular outline as the mouth 23, a depending shoulder 24 is formed along the periphery of two sides of said opening, the third side having the wall of the cover forming a boundary therefor. This wall 24 is adapted to fit over the upper edge of the member 18 around the mouth 23, so that when the cover 11 is removable the cover will be replaced by slipping the wall 24 over the mouth 23, thus assuring correct alignment of the opening in the cover with said mouth.

Adjacent the opening in the cover, a sealing flap 25 is slidably mounted in grooves formed in spaced-apart arcuate guides 26 and 27. The former is provided with a tongue 28 at one end, and the latter with a similar tongue 29 at the other end, to serve as limits to the movement of the flap. The latter is provided with a handle ear 30 whereby the flap may be moved from one position to another.

In use as a coffee-dispensing container, the container is filled with ground coffee. The flap 25 is moved to the position shown in Figure 1. The container is then turned substantially upside down into the position shown in Figure 6, and only that amount of coffee which has previously occupied the compartment enclosed by the member 12 will pass through the member 18 and out of the mouth 23. This, as is obvious, will be a fixed quantity. As the container is being placed right side up, that portion of the contents which in Figure 6 occupies the space to the right of the seam 21 and the space between the members 12 and 18 will be captured by the upper portions of the member 12 and will therefore be compelled to pass into the compartment formed by the member 12, where it remains captured. Likewise, some of the coffee will pass between the space 15 and 16 of the angle having the apex 17 into said compartment. It has been found in practice, that the variation within reasonable limits of the quantity of coffee to be fixed in the measure to suit various tastes may be best had by varying the slope of the sides 15 and 16 and thereby varying the relative distance between the apex 17 and the lowermost extremity of the seam 21. It is to be noted in Figure 3 that this apex lies at a very small distance below the seam 21. On the next tilting of the container, that portion of the contents alone which has remained captured in the said pocket, will pass through the member 18 and mouth 23, which portion is again the predetermined measure.

It is thus obvious that the amount of coffee which will be dispensed at each single act of pouring from the container, will in every such act be the same so that it will be unnecessary to measure the quantity dispensed. Furthermore, the cover 11 may be permanently secured to the container 10 after the container has been filled, in the warehouse, and thereafter only the very small opening in the cover will exist through which air may enter the container, and that only for very brief intervals. Hence it is obvious that by using this container with the cover sealed thereto the contents will remain fresh a longer time than is the case where the entire cover must be removed.

Obviously, modifications in form and structure may be made without departing from the spirit of the invention.

I claim:

In combination with a container, a member substantially angular in cross-section secured to said wall to form a pocket between said member and the wall, a second member of substantially the same cross-section mounted above said first member and having its lower extremity lying within said pocket, said second member being substantially funnel-shaped with the narrower opening at the top, said first member having an angular cut-out projecting downward from its upper edge, the apex of said cut-out lying at approximately the level of the lower edge of said second member.

JOHN HEITMANN.